United States Patent [19]

Brandt

[11] Patent Number: 5,231,060

[45] Date of Patent: * Jul. 27, 1993

[54] WHISKER-REINFORCED CERAMIC CUTTING TOOL MATERIAL

[75] Inventor: Nils G. L. Brandt, Solna, Sweden

[73] Assignee: Sandvik AB, Sandviken, Sweden

[ * ] Notice: The portion of the term of this patent subsequent to Aug. 25, 2009 has been disclaimed.

[21] Appl. No.: 864,550

[22] Filed: Apr. 7, 1992

Related U.S. Application Data

[63] Continuation of Ser. No. 598,115, Oct. 16, 1990, Pat. No. 5,141,901.

[51] Int. Cl.$^5$ .............................................. C04B 35/10
[52] U.S. Cl. ........................................ 501/87; 51/309
[58] Field of Search ............................ 501/87; 51/309

[56] References Cited

U.S. PATENT DOCUMENTS

| | | | |
|---|---|---|---|
| 4,366,254 | 12/1982 | Rich et al. | 501/89 |
| 4,745,091 | 5/1988 | Landingham | 501/87 |
| 4,804,645 | 2/1989 | Ekstrom | 501/105 |
| 4,820,663 | 4/1989 | Mehrotra et al. | 501/87 |
| 4,844,848 | 7/1989 | Clark et al. | 264/43 |
| 4,852,999 | 8/1989 | Mehrotra et al. | 51/309 |
| 4,867,761 | 9/1989 | Brandt et al. | 51/309 |
| 4,925,458 | 5/1990 | Mehrotra et al. | 51/293 |
| 4,956,315 | 9/1990 | Mehrotra et al. | 501/87 |

OTHER PUBLICATIONS

World Patents Index Latest Week 8836, Derwent Publications Ltd., London, Great Britain; AN 88-254400 & JP-A-63 185 869; (Toshiba Tungalloy KK), 1 Aug. 1988; abstract.

World Patents Index Latest Week 8848; Derwent Publications Ltd.; London, Gread Britain; AN88-341446 & JP-A-63 252 960; (Sumitomo Elec Ind KK), 20 Oct. 1988; abstract.

H. Scholtze et al, "Keramik, Teil 2: Keramische Werkstoffe", 1983, Springer-Verlag, Berlin, Table 7.1.

Primary Examiner—Mark L. Bell
Assistant Examiner—Deborah Jones
Attorney, Agent, or Firm—Burns, Doane, Swecker & Mathis

[57] ABSTRACT

The present invention relates to a ceramic whisker-containing cutting insert for chipforming machining of steel having improved mechanical, thermal and wearing properties.

Besides an oxide-based matrix, the material contains 5-50, preferably 10-40, % by volume of homogeneously distributed whiskers or platelets of nitrides, carbides and/or borides of metals from group IVB (Ti, Zr or Hf) and/or VB (V, Nb or Ta) in the periodic system (or solid solutions thereof) having a linear expansion coefficient being lower than that of $Al_2O_3$, preferably at the most 85% of that for $Al_2O_3$ measured at 300–1300K. The properties of the composite material can be further modified by coating the whisker material with thin layers. The whisker reinforced cutting tool material shows an improved toughness behavior.

5 Claims, No Drawings

WHISKER-REINFORCED CERAMIC CUTTING TOOL MATERIAL

This application is a continuation of application Ser. No. 07/598,115, filed Oct. 16, 1990, now U.S. Pat. No. 5,141,901.

The present invention relates to ceramic cutting tool materials and particularly to such cutting materials in which monocrystalline whiskers (hair crystals) are uniformly distributed in a ceramic matrix containing aluminum oxide which leads to an improved strength and toughness without negatively influencing the wear resistance.

Ceramic cutting tools have now been available for several decades but they have not until recently had any great commercial importance for use in chipforming machining. The main reason for the limited growth of ceramic cutting tools has been sudden and unexpected tool failures because of their inherent inadequate strength and toughness.

In recent years, the properties of ceramic cutting tool materials have been improved in many respects and their use in cutting of cast iron and hot-strength (e.g., nickel-base) alloys has relatively increased. The proportion of ceramic cutting inserts used is still very small, however, where steel is the dominating work piece material being machined because steel makes large simultaneous demands upon strength, toughness and wear resistance which have not been fulfilled by currently known ceramic cutting tool materials.

Aluminum oxide based cutting tool materials are very sensitive to thermal crack formation because aluminum oxide in itself has a relatively poor thermal conductivity. This leads to very short tool lives in machining steel, particularly under conditions with short operating times and varying cutting depth.

To a certain extent, the thermal properties have been improved by additions of titanium carbide and/or titanium nitride which enhance the thermal conductivity of the composite material. The additional of titanium carbide/nitride also increases the hardness of the material. In comparison with pure aluminum oxide materials, an increased tool life is therefore obtained in the cutting of harder work piece materials and in operations demanding thermal shock resistance. However, this kind of material has too poor a toughness behavior for general use in the cutting of steel.

A later development relates to alloying of uniformly dispersed fine-grained zirconium oxide particles in a matrix of aluminum oxide. A transition of the "metastable" zirconium oxide particles during use increases both strength and toughness and thus leads to a more predicted tool life.

The thermal properties of said type of material are, however, only slightly better than those of pure aluminum oxide materials. Therefore, initiation and growth of thermally induced cracks is still a great problem in practical cutting operations generating high cutting edge temperatures such as the cutting of steel.

It has recently been shown that alloying of SiC-whiskers, with mono-crystalline hair crystals, in a matrix of aluminum oxide leads to a greatly improved fracture toughness and strength. Ceramic cutting tool materials based upon said concept have shown very good performances in the cutting of hot-strength materials in particular but in the cutting of steel they have shown surprisingly short lives because of preferential attack of the SiC-crystals. This leads to a weakening of the surface zone with accompanying high wear and risks of crack initiation.

It is thus an object of the invention to obtain a ceramic material for chipforming machining, particularly of steel, in which the above-mentioned weaknesses of today's known aluminum oxide based cutting tool materials have been eliminated. Thus, in materials according to the invention, there is a unique combination of strength, toughness, thermal-shock-resistance and wear resistance which has not been possible to obtain with earlier known oxide-based cutting tool materials.

In U.S. Pat. No. 4,867,761, oxide-based ceramic cutting tool materials are strengthened by whiskers of carbides, nitrides and borides of Ti or Zr or solid solutions thereof having a low solubility in steel resulting in a cutting tool material with an improved and more predictable toughness, as well as improved strength and resistance to thermal shocks without deterioration of the wear resistance to any appreciable degree particularly when cutting steel. This has not been possible with earlier known material compositions.

It has now been surprisingly found that further improvements of fracture toughness and resistance to thermal shocks can be obtained if the differences in thermoelastic properties between the aluminum oxide and the whisker material are large.

According to R. W. Rice, Ceram. Eng. Sci. Pro., 2 (1981) 661. and A. G. Evans, H. K. Bowen, R. W. Rice and K. M. Prevo, Rep. Materials Research Council Summer Conf., La Jolla, Calif., 1983. the most essential criteria in developing a fiber-strengthened ceramic material are as follows:

1. A high fiber modulus and strength (preferably more than twice that of matrix for an effective load transition to the fiber);

2. A small fiber diameter (of the same range of order as the grain size in the matrix);

3. A homogenous distribution of fibers;

4. No or small chemical bond between fiber and matrix;

5. No chemical reactions which destroy or change the properties of the fiber;

6. A large volume fraction of fibers; and

7. Comparable thermal expansion coefficients (alpha), but preferably a greater expansion coefficient for the fiber than for matrix so that compressive strains are obtained in the matrix.

Under point 7, it is specially mentioned that the thermal expansion coefficient shall be greater than or equal to that of matrix. This requirement is fulfilled in the above-mentioned U.S. Pat. No. 4,867,761 because the difference of the thermal expansion coefficient between TiC, TiN, $TiB_2$ and ZrC, ZrN, $ZrB_2$, respectively, and $Al_2O_3$ is very small.

It has now been found particularly favorable to use whiskers with a lower thermal expansion coefficient than that of $Al_2O_3$ which leads to tensile strains in the aluminum oxide and compressive strains in the whisker. The exact mechanisms of the improvements of fracture toughness and resistance to thermal shock are not known but probably there is also a formation of microcracks during use which favorably affects the toughness behavior and resistance to thermal shock. Another factor which can be important is that tensile strains in the aluminum oxide are oriented in parallel with the longitudinal axis of the whisker and therefore crack propagation occurs perpendicular to the whisker which favors bridging of the cracks (the whisker bridges over a passing crack and strives to hold it together).

The ceramic cutting tool material according to the present invention comprises an oxide-based, preferably aluminum oxide-based matrix with 5-50, preferably 10-40, often 25-35, % by volume of homogeneously dispersed whiskers based upon nitrides, carbides and/or borides of metals from group IVB (Ti, Zr or Hf) and/or VB (V, Nb or Ta) in the periodic system or solid solutions thereof, with the whiskers having a thermal expansion coefficient which is lower than that of $Al_2O_3$ and a low solubility in steel.

In Table 1 below, examples are given of whisker materials which fulfill the criteria of low solubility in steel.

TABLE 1

| Thermal expansion coefficient ($10^{-6}$ $K^{-1}$ 300-1300 K) | | |
|---|---|---|
| $Al_2O_3$ | 8.4 | about 8 |
| TiN | 7.5-8.9 | |
| HfC | 6.5 | about 6 |
| HfN | 6.3 | |
| NbC | 5-7 | |
| TaC | 4-6.5 | about 5 |
| TaN | 5.0 | |
| $TaB_2$ | 5.2 | |

As evident from Table 1, no or very small self-strains can be expected by the use of TiN-whiskers. Use of HfC, HfN and NbC gives tensional strains in the aluminum oxide These strains will be still greater by use of TaC, TaN or $Tab_2$.

The whisker material consists of monocrystals with a diameter of 0.2-10 μm and a length of 2.5-100 μm and a length/diameter ratio that is preferably 5-10. The grain size of the oxide matrix shall be <10 μm, preferably <4 μm. The oxide matrix is essentially ceramic oxides or ceramic oxides mixed with hard carbides and/or nitrides and/or borides and/or binder metal. Preferably, the ceramic matrix shall contain <20% by volume of $ZrO_2$.

The cutting tool material is made by wet-milling and mixing of the oxide-based powder and monocrystalline whisker crystals. After drying, the mixture is pressed to desired geometrical form and sintered without pressure to almost theoretical density. After sintering, the possible remaining, so-called, closed porosity can be removed by hot-isostatic pressing. If it is not possible during sintering to obtain closed porosity, the material can be pressure-sintered by a suitable graphite tool or be hot-isostatically pressed after canning to desired density. The sintering method is dependent upon the whisker material and is chosen so that the cutting tool material reaches a density exceeding 99% of the theoretical density.

The use of whisker-reinforcement in the aluminum oxide-based matrix leads to a significant increase of the fracture toughness. The mechanisms causing said increase can be load transition between whisker and matrix, crack deflection and whisker pull-out. Said mechanisms exploit and depend upon crack-propagation occurring along a sufficiently weak interface between whisker and matrix. The bonding force between whisker and matrix is therefore an important parameter which can be influenced by coating the whisker material with thin layers of, for example, BN or graphite in order to further improve the fracture strength. In the actual case, a contribution from the internal strains being formed by use of whiskers with lower thermal expansion coefficient than that of matrix is also obtained.

The invention is additionally illustrated in connection with the following Example which is to be considered as illustrative of the present invention. It should be understood, however, that the invention is not limited to the specific details of the Examples.

EXAMPLE

30% by volume of titanium nitride-, hafnium nitride- and tantalum nitride-whiskers, respectively, are wet-mixed with 70% by volume of a mixture of 95.5% by weight of $Al_2O_3$, 4.2% by weight of $ZrO_2$ and 0.3% by weight of MgO. After drying in vacuum, the mixtures are dry-mixed and pressed to bodies. The bodies are sintered at 1550° C. to 99% of the theoretical density by isostatic hot-pressing.

$K_{IC}$ is measured by means of the so called indentation method. In said method an indentation is made by means of a pyramid diamond tip and $K_{IC}$ is calculated from the size of the cracks produced from the corners of the indentation.

At the measurement a reference of $Al_2O_3$+4.2% by weight of $ZrO_2$+0.3% by weight of MgO was used.

$K_{IC}$-values for the various material combinations are given in Table 2.

TABLE 2

| | $K_{IC}$ |
|---|---|
| 1. $Al_2O_3$ + 4.2% by weight of $ZrO_2$ + 0.3% by weight of MgO + 30% by volume of TiN (whiskers) | 6.1 |
| 2. $Al_2O_3$ + 4.2% by weight of $ZrO_2$ + 0.3% by weight of MgO + 30% by volume of HfN (whiskers) | 7.0 |
| 3. $Al_2O_3$ + 4.2% by weight of $ZrO_2$ + 0.3% by weight of MgO + 30% by volume of TaN (whiskers) | 8.2 |
| 4. $Al_2O_3$ + 4.2% by weight of $ZrO_2$ + 0.3% by weight of MgO | 4.0 |

From Table 2, it is evident that while alloying with TiN-whiskers increases the fracture toughness over the non-whisker-reinforced material, even greater increases can be obtained using HfN- and TaN-whiskers. The fracture toughness increases with an increasing difference in the thermal expansion coefficient of the whiskers. The preferred embodiment therefore includes a whisker material having an expansion coefficient of at the most 85%, preferably at the most 70%, of that of $Al_2O_3$ measured in the temperature range 300-1300K. The fracture toughness is a parameter which shows the capacity of a material to stand mechanical stresses without leading to catastrophic failures. In the case of chip-forming machining, it means that higher feeds can be permitted, i.e., the rate of material removal can be increased for a certain cutting speed.

The invention has been described by referring to whisker-reinforced materials. It is obvious to those skilled in the art, however, that similar results can be obtained if the whiskers are wholly or partly substituted by monocrystalline platelets (discs) or similar. The diameter of the platelets shall be less than 50 μm, preferably less than 20 μm, and the thickness less than 5 μm, preferably less than 2 μm.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Oxide-based ceramic cutting insert for chipforming machining of steel, comprising a ceramic oxide-based matrix of alumina and less than 20% zirconia and 5–50% by volume, of homogeneously dispersed whiskers or platelets of at least one of the carbides of in the periodic system Nb, Hf and V and the nitride of Hf, the whiskers or platelets having a linear expansion coefficient measured at 300–1300K which is at the most 85% of that of $Al_2O_3$.

2. Cutting insert according to claim 1, wherein the oxide-based matrix contains 10–40% by volume of the said whiskers or platelets.

3. Cutting insert according to claim 1, wherein the whiskers or platelets have a linear expansion coefficient measured at 300–1300K, which is at the most 70% of that of $Al_2O_3$.

4. Cutting insert according to claim 1, wherein the oxide-based matrix contains 25–35% by volume of the said whiskers of platelets.

5. Cutting insert according to claim 1, wherein the whiskers or platelets are HfC, HfN, or NbC.

* * * * *